Patented Apr. 14, 1942

2,279,411

UNITED STATES PATENT OFFICE 2,279,411

COUPLERS COMBINED WITH HARDENING AGENTS

Willard D. Peterson, Rochester, N. Y., assignor to Eastman Kodak Company, Rochester, N. Y., a corporation of New Jersey No Drawing. Application November 26, 1940, Serial No. 367,215. In Great Britain January 18, 1940.

8 Claims. (Cl. 95—6)

This invention relates to sensitive material for color photography and in particular to gelatino silver halide emulsions having couplers incorporated therein.

There have been many proposals for rendering color-forming or coupling compounds non-diffusing in emulsion layers. In processes of multi-color photography in which we have differentially color sensitized emulsions coated on one side of a support and one or more of the emulsion layers contain couplers, it is necessary for the couplers to be retained in the emulsion layers in which they are incorporated both during coating and during processing of the photographic element. Color forming or coupling compounds used in processes of this type are those containing a phenolic hydroxyl or reactive methylene group which is capable of reacting with the oxidation product of a primary aromatic amino coupling developing agent on photographic development to form dye images in the layers.

It is an object of this invention to provide sensitive elements for color photography in which the diffusion of the couplers incorporated therein is prevented or reduced to a minimum.

I have found that the diffusion of couplers in gelatin layers may be prevented if a coupler containing an amino group is mixed with the emulsion in the presence of a hardening agent containing at least two carbonyl groups such as aldehyde groups. Hardening agents of this type react both with the amino group of the coupler and with the amino groups of the gelatin to combine the coupler chemically with the gelatin through the medium of the hardening agent. This reaction is similar to that which takes place in the formation of a Schiff's base which may be represented as follows:

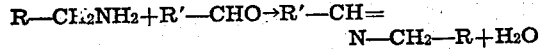

The amino group reacted with the hardening agent should, in general, be a primary amino group but secondary amines may be made to react with the hardening agents under certain conditions. It is well known that gelatin contains amino end groups and these may be reacted with the hardening agents.

Specific color forming or coupling compounds which may be used in the process of my invention are as follows:

1-(p-aminophenyl)-3-methyl-5-pyrazolone
o-hydroxyphenyl thiourea
m-aminophenol
p-(ω-benzoylacetamino)-benzene-sulfonamide
p-(4-ethoxybenzoylacetamino) benzene-sulfonamide The o-hydroxyphenyl thiourea is referred to in British Patent 478,985 and the m-aminophenol is listed in French Patent 836,144. The sulfonamide couplers are referred to in Vittum, Peterson and Porter U. S. application Serial No. 266,152.

The hardening agents which may be used in my process include any organic hardening agent containing two or more carbonyl groups including aldehydic and ketonic groups such as glyoxal, diacetyl and terephthaldehyde. Some of the compounds described in Shepard and Houck U. S. Patent 2,059,817, granted November 3, 1936, and Staud and Briggs U. S. Patent 2,063,351, granted December 8, 1936, are suitable.

Couplers rendered non-diffusing according to my invention may be incorporated either in single layers or in multi-layer coatings in which three sensitive silver halide layers are coated on one side of a support. In an element of this type, 1-(p-aminophenyl)-3-methyl-5-pyrazolone can be used as a coupler for the green-sensitive layer to produce a magenta dye, m-aminophenol can be used as the coupler for the red-sensitive layer to produce a blue-green dye and either p-(ω-benzoylacetamino)-benzene-sulfonamide or p-(4-ethoxybenzoylacetamino)-benzene sulfonamide can be used as the coupler for the blue-sensitive layer to produce a yellow dye.

The following examples will serve to illustrate the nature of my invention:

Example 1

To one gram of 1-(p-aminophenyl)-3-methyl-5-pyrazolone hydrochloride in 50 cc. of water is mixed 0.4 gram of glyoxal contained in 25 cc. of water. The resulting solution is immediately mixed well with 500 grams of silver halide emulsion. The resulting emulsion is coated upon a base, allowed to dry, and is overcoated with a gelatino-silver halide emulsion. Upon exposing and processing in an alkaline developer solution of p-aminodiethylaniline, a magenta dye is generated solely in the lower layer, since there is no coupler in the upper layer with which the developer can react. In the absence of the glyoxal, the dye is generated in both layers (indicating diffusion). If the unsubstituted pyrazolone—namely, 1-phenyl-3-methyl-5-pyrazolone—is used with the same concentration of glyoxal, bad diffusion of the coupler takes place, with the result that dye is generated in both layers.

Example 2

One gram of m-aminoacetoacetanilide in 40 cc. of 30 per cent aqueous methyl alcohol is treated with 0.4 gram of glyoxal contained in 25 cc. of water. This solution is added to 300 cc. of a silver halide emulsion. The resulting emulsion is coated upon a base, allowed to dry, and is overcoated with a gelatino-silver halide emulsion. Upon exposing and processing this material in an alkaline developer solution of p-aminodiethylaniline, a yellow dye is generated in the lower layer. In the absence of the glyoxal, dye is generated in both layers.

It will be understood that numerous modifications may be made in the features of my invention described herein and that the invention is to be taken as limited only by the scope of the appended claims.

I claim:

1. The method of rendering color couplers non-diffusing in gelatino-silver halide emulsions, which comprises mixing with the emulsion a coupler containing a primary amino group and a group reactive with the development product of a primary amino developing agent, and a gelatin organic hardening agent containing at least two carbonyl groups capable of reacting with the coupler and with gelatin, and producing therein a reaction of the gelatin, coupler and hardening agent.

2. The method of rendering color couplers non-diffusing in gelatino-silver halide emulsions, which comprises mixing with the emulsion a coupler containing a primary amino group and a group reactive with the development product of a primary amino developing agent, and a gelatin organic hardening agent containing at least two aldehyde groups capable of reacting with the coupler and with gelatin, and producing therein a reaction of the gelatin, coupler and hardening agent.

3. The method of rendering color couplers non-diffusing in gelatino-silver halide emulsions, which comprises mixing with the emulsion a coupler containing a primary amino group and a group reactive with the development product of a primary amino developing agent, and a gelatin organic hardening agent containing at least two ketone groups capable of reacting with the coupler and with gelatin, and producing therein a reaction of the gelatin, coupler and hardening agent.

4. A color-forming photographic emulsion comprising a gelatino-silver halide layer containing the reaction product of a gelatin organic hardening agent containing at least two carbonyl groups, with a coupler having both an amino group and a group reactive with the development product of a primary aromatic amino developing agent, and with the gelatin.

5. A color-forming photographic emulsion comprising a gelatino-silver halide layer containing the reaction product of a gelatin organic hardening agent containing at least two aldehyde groups, with a coupler having both a primary amino group and a group reactive with the development product of a primary aromatic amino developing agent, and with the gelatin.

6. A color-forming photographic emulsion comprising a gelatino-silver halide layer containing the reaction product of a diketone with a coupler having both a primary amino group and a group reactive with the development product of a primary aromatic amino developing agent, and with the gelatin.

7. A color-forming photographic emulsion comprising a gelatino-silver halide layer containing the reaction product of a gelatin organic hardening agent containing at least two carbonyl groups with 1-(p-aminophenyl)-3-methyl-5-pyrazolone and with the gelatin.

8. A color-forming photographic emulsion comprising a gelatino-silver halide layer containing the reaction product of glyoxal with 1-(p-aminophenyl)-3-methyl-5-pyrazolone and with the gelatin.

WILLARD D. PETERSON.